United States Patent [19]

Jeffords

[11] Patent Number: 5,222,690
[45] Date of Patent: Jun. 29, 1993

[54] VEHICULAR DESK OR INFORMATION DISPLAY

[76] Inventor: Lloyd M. Jeffords, 23 E. 10th St., Apt. 703, New York, N.Y. 10003

[21] Appl. No.: 745,475

[22] Filed: Aug. 15, 1991

Related U.S. Application Data

[63] Continuation-in-part of Ser. No. 606,775, Oct. 29, 1990.

[51] Int. Cl.$^5$ .............................................. A47B 19/00
[52] U.S. Cl. .......................... 244/1 R; 224/42.45 R; 224/277; 224/276; 248/230; 248/229; 248/447.2
[58] Field of Search ............... 244/1 R; 224/42.45 R, 224/276, 277; 108/44; 248/229, 230, 231.6, 442.2, 447.2, 917

[56] References Cited

U.S. PATENT DOCUMENTS

| | | | |
|---|---|---|---|
| 1,680,998 | 8/1928 | Krantz | 224/277 |
| 1,730,790 | 10/1929 | Squires | 224/277 |
| 2,141,849 | 12/1938 | Baer | 248/447.2 |
| 2,596,627 | 5/1952 | Wahnish | 248/230 |
| 2,862,328 | 12/1958 | Wadsworth | 108/44 |
| 3,099,102 | 7/1963 | Mitsuyasu | 248/442.2 |
| 3,809,338 | 5/1974 | Gross, Jr. et al. | 244/1 R |
| 4,021,013 | 5/1977 | Wiersma | 248/447.2 |
| 4,690,285 | 9/1987 | Stone | 248/442.2 |
| 4,854,538 | 8/1989 | Von Schalscha | 224/42.45 R |
| 4,969,623 | 11/1990 | Bernier | 248/442.2 |
| 4,987,690 | 1/1991 | Aaldenberg et al. | 248/447.2 |

FOREIGN PATENT DOCUMENTS 1124798 10/1956 France .................................. 248/230

OTHER PUBLICATIONS

Diamond Star Aviation, Inc., Yokeboard, Apr. 1991.
Thule System 549 (1050-09-01) upright bicycle carrier, owner's manual.

*Primary Examiner*—Joseph F. Peters, Jr.
*Assistant Examiner*—Anne E. Bidwell
*Attorney, Agent, or Firm*—Thomas J. Kowalski

[57] ABSTRACT

An apparatus for attaching to a steering column, column or instrument panel, e.g., an aircraft yoke column, having a two-part clamp to so attach, an arm movably connected to the clamp, and an information display movably connected to the arm. In a presently preferred embodiment, any circular column of $\frac{3}{4}''$ to $\frac{7}{8}''$ diameter can be attached to. The movement of both the arm and information display is upwardly or downwardly such that the overall effect is that the display can be moved inwardly or outwardly. The connections of the arm to the clamp and/or of the arm to the information display can be a joint or a hinge. The information display can be a video display, e.g., a moving map computer or a display screen for such a computer, or, a clipboard or ring binder; the video display and clipboard are presently preferred.

20 Claims, 5 Drawing Sheets

VEHICULAR DESK OR INFORMATION DISPLAY

RELATED APPLICATIONS

This application is a continuation-in-part of co-pending U.S. application Ser. No. 07/606,775, filed Oct. 29, 1990, incorporated herein by reference.

FIELD OF THE INVENTION

This invention relates to a device to hold an information display such as documents, e.g., flight documents such as NOS, SID, STAR and instrument arrival plates, or a video display, e.g., a flat screen video display such as a moving map computer video display, to a steering columns of a vehicle, e.g., a torque tube, the column of a control yoke of an airplane. This invention further relates to an apparatus for attachment to a steering column of a vehicle which preferably comprises a means to grip such a column, preferably removable means, e.g. a clamp such as a two part adjustable clamp or "two-C-clamp", an arm movably or jointedly connected to the gripping means such that the arm can move upwardly and downwardly, means to movably or jointedly connected the arm to the gripping means, a support movably or jointedly connected to the arm so that the support can move upwardly and downwardly, means to movably connect the arm to the support, an information display (e.g. (i) a clipboard, (ii) board having a ring binder or other means to hold paper, or (iii) a video display), mounted to the support; wherein the overall effect of the movability of the arm and support is that the clipboard, ring binder or video display can be moved inwardly to or outwardly from the steering column, as well as upwardly or downwardly. The information display can be mounted to the support by any mounting suitable e.g., means to mount a clipboard, board with means to hold paper, or video display; and, these means can fixedly e.g., by rivet, or removably attach. These mounting means can also be screws, nuts and bolts, or the like.

Alternatively, the support can be a part of the information display, i.e., the information display as a unitary item can have the support included. If the information display is a video display, it can connect to a computer, or be a computer. The movable connecting means can comprise corresponding mating pieces through which rods pass perpendicularly so as to form a joint or hinge, e.g., screws, bolts or rivets or the like can pass through extensions on the arm which mate with extensions of the gripping means so as to form a joint or hinge. The objective is that the information display (clipboard, board, or video display) be easily manipulated and that it essentially not impede the use of the steering mechanism and essentially not obstruct the view of the instrument panel.

BACKGROUND OF THE INVENTION

It is well known that pilots must routinely consult pre-fight checklists, fight charts, approach plates, and other various fight operations documents, while operating an airplane. Because of both the number and awkwardness of use of these documents, it has proven difficult for pilots to comfortably and effectively consult these documents as the need arises, and in a timely fashion. Additionally, pilots must routinely have visual access to all critical flight instruments and engine and fuel monitoring instruments.

In this age of portable, laptop computers, pilots can consult a movable map which appears on the display of a laptop computer.

Devices for holding documents for pilots include those which are strapped onto one thigh of the pilot by use of an adjustable strap. These devices generally have a document holder in the form of a flat base which is interconnected with the adjustable strap. A hinged plate may be included which acts as a divider between two documents only, and a pencil holder may also be included. These devices suffer from the discomfort and excessive bother associated with having to strap on and strap off the device. Additionally, these devices suffer from the fact that the pilot must continually look down at his thigh to read the documents, when he should rather be looking in a forward direction toward the instruments and windshield. Excessive movement of the head, without outside visual reference, e.g., in instrument meterological conditions can cause vertigo and spatial disorientation. Further, these devices require document manipulations which necessitate the pilot's hands being taken away from the controls. Consequently, it is considered that this class of device does not adequately solve the problem of document access by pilots.

The consultation of a laptop computer positioned on the lap of a pilot or worse, on the seat next to him (owing to its size), suffers from the same deficiencies as the aforementioned device, namely, discomfort, and, the fact that the pilot must continuously look down.

During the prosecution of predecessor application Ser. No. 07/606,775, the following U.S. patents were cited and are hereby incorporated herein by reference:

| PATENT NO. | PATENTEE | ISSUE DATE |
|---|---|---|
| 4,969,623 | Bernier | Nov. 1990 |
| 3,809,338 | Gross, Jr. et al | May 1974 |
| 2,141,849 | Baer | Dec. 1938 |
| 1,680,998 | Krantz | Aug. 1928 |
| 1,730,790 | Squires | Oct. 1929 |
| 2,862,328 | Wadsworth | Dec. 1958 |

Wadsworth relates to vehicular desk for attachment to the underside or top of an instrument board. Wadsworth does not teach or suggest the device of the present invention which attaches to a steering column.

Squires is directed to a map holder for attachment to a steering post of a motor vehicle. Squires does not teach or suggest a device for attachment to a steering column which has an arm which is movably connected to the gripping means, and an information display which is movably connected to the arm such that the arm and display can both move upwardly and downwardly and display can be moved inwardly or outwardly from the steering column. Thus, Squires fails to teach or suggest the present invention.

Krantz relates to an apparatus for attachment to a steering column, but, like Squires, fails to teach or suggest the combination of a movably mounted arm, a movably mounted information display and the overall effect thereof with respect to positioning the display, as disclosed herein. Baer is directed to a steering wheel table; and, suffers from the same deficiencies of Squires and Krantz. Also, Baer's device comes up from underneath the lowest position of the steering wheel such that it impedes the use of the steering mechanism of a vehicle (one cannot turn the wheel without running into the device).

Likewise, a further deficiency of Wadsworth, Squires and Krantz is that their devices impede the view of the instrument panel, i.e., their devices block the instruments which must be scanned by the operator during operation (e.g., flight) of the vehicle (e.g., airplane).

Gross relates to a timer and approach plate holder for aircraft which is a spring clip for mounting onto the yoke column, an upwardly extending post and an alligator clip attached to the post (for holding paper). Gross does not teach or suggest the combination of a movably mounted arm, a movably mounted information display and the overall effect thereof with respect positioning the display as disclosed herein; and, Gross does not teach or suggest a firm means to support the information (if hard copy) being displayed, e.g., a clipboard or board; and, like all of the previously mentioned documents, Gross does not contemplate a video display. The alligator clip of Gross is not a teaching or suggestion of a clipboard; and, is deficient in that papers flop or are free to move around and are not set firmly in place or supported from beneath. Gross fails to teach or suggest the present invention.

Without admitting that Bernier is prior art with respect to the present invention, Bernier too fails to disclose or suggest the present invention. Bernier is directed to a flight document organizer which consists of a quick release latch which attaches to the yoke column; a slotted extension arm and a removable desk. Bernier fails to teach or suggest the combination of the movable (upwardly and downwardly) arm and information display and the effect thereof (ability to move the display inwardly and outwardly from the yoke, as well as upwardly and downwardly); or the use of a video display; and, Bernier's device severely impedes the use of the yoke.

In addition, during the prosecution of the aforementioned predecessor application, Applicant became aware of products available from Diamond Star Aviation, Inc., Allaire Airport, Bldg. 18, P.O. Box 2309, Farmingdale, N.J. 07727, as shown in a brochure dated "Apr. 1, 1991". Without commenting as to whether these products are prior art, since these products employ Velcro (trademark) straps to connect an acrylic plastic display, and the brochure warns against using these products in direct sun in hot weather because of warping, they are not a disclosure or suggestion of the present invention, and, are considered to have deficiencies (e.g, Velcro deterioration and separation, and warping).

In view of the foregoing, it is believed that there has not been a disclosure or suggestion heretofore of the apparatus of the present invention. More importantly, none of the devices of the aforementioned documents achieves the objectives stated herein, as does the present invention, namely of providing an easily manipulated, removable, movable or adjustable apparatus for holding documents or displaying information for consultation while operating a vehicle, without significantly impeding or obstructing the operation of thereof (i.e., without significantly obstructing or impeding the steering mechanism and view of instruments).

SUMMARY OF THE INVENTION

It has now been surprisingly discovered that the combination of a gripping means, a movably, jointedly, or hingedly connected arm connected thereto and a movably, jointedly, or hingedly connected information display connected to the arm can allow for easy manipulation of an information display. Accordingly, the present invention provides an apparatus for attachment to a column, such as a steering column, or an automotive or boat fixed surface for displaying information comprising:

a means to grip the column or to attach to the surface an arm movably connected to the gripping/attaching means such that the arm can move upwardly or downwardly with respect to the gripping/attaching means, means to movably connect the arm to the gripping/attaching means, an information display movably connected to the arm such that the display can move upwardly and downwardly with respect to the arm, and means to movably connect the display to the arm, wherein the effect of the connecting means of the arm to the gripping/attaching means and of the connecting means of the display to the arm is that the display can move inwardly and outwardly with respect to the column or surface.

The present invention contemplates that the information display be a video display, a clipboard, or a board having means to hold paper, e.g., a ring binder. The means to mount the display to the arm can include a support which is movably mounted to the arm such that the support moves upwardly or downwardly with respect to the arm; and, means (either fixed or removable) to attach the support to the video display, clipboard or board having means to hold paper. The gripping means can be a clamp such as a two-piece or "two-'C'" clamp which provides at least three points of contact with the column. Additional components can be attached to the device, e.g., a lamp, flashlight, or pen (writing instrument) can be attached to the information display.

BRIEF DESCRIPTION OF DRAWINGS

The present invention will be described with reference to the accompanying drawings, incorporated herein by reference, wherein:

FIGS. 4 A-I show the components of the embodiment of FIGS. 1 and 2;

DETAILED DESCRIPTION

Figure 1:
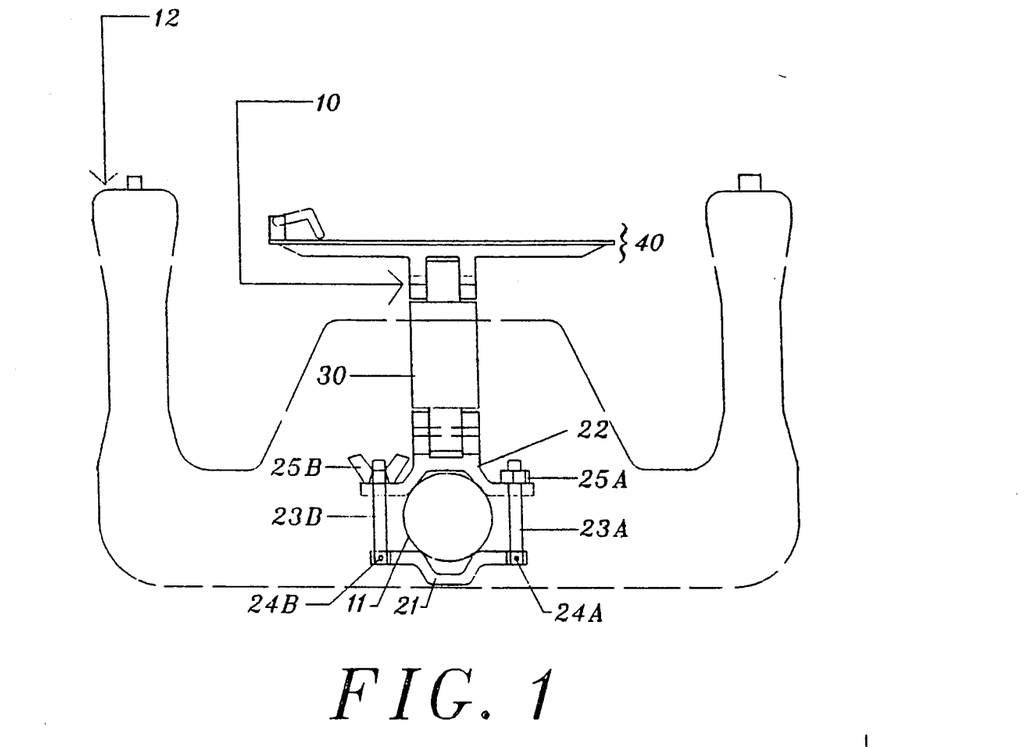
FIG. 1 shows a top plan view of an embodiment of the present invention on a typical aircraft control column.
Figure 2:
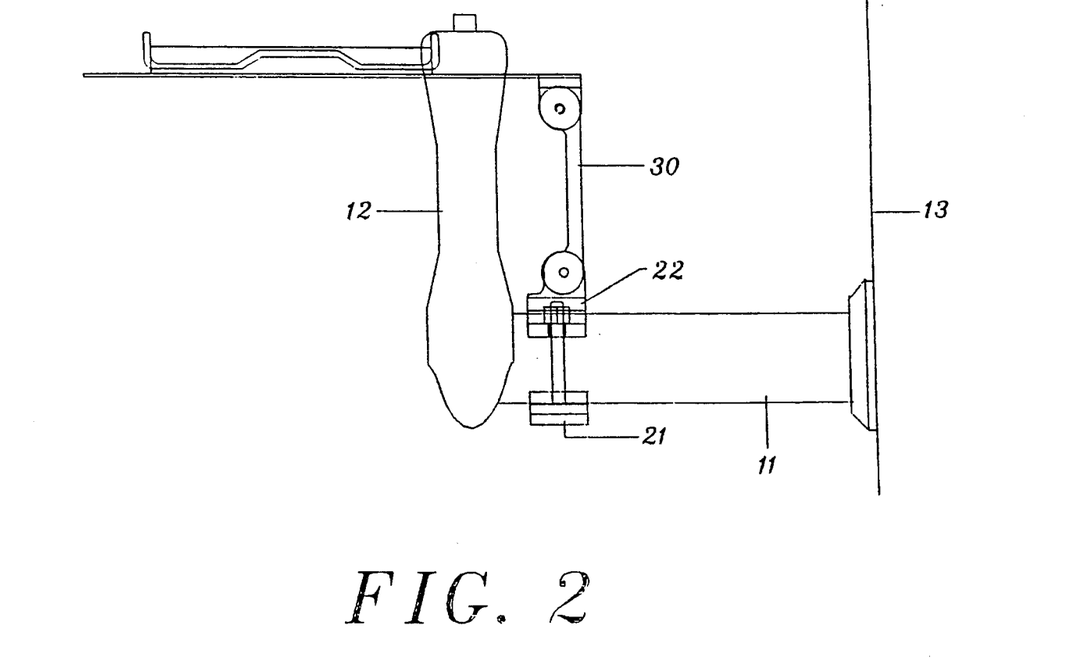
FIG. 2 shows a side view of an embodiment of the present invention on a typical aircraft control column.

With reference to all of the Figures, and FIGS. 1 and 2, initially, wherein Device 10 (an embodiment of the present invention) is attached to control column 11. Typical aircraft control yoke 12 is attached to control column 11. Control column 11 runs to instrument panel 13.

Referring to FIGS. 1–4I, device 10 is attached to control column 11 by gripping means 20. Gripping means 20 comprises: two "C-clamps" 21 and 22 which contact control column 11; and rods 23A and 23B, pins 24A and 24B, and nuts 25A and 25B. Rods 23A and 23B, pins 24A and 24B, and nuts 25A and 25B, collectively, act to pull C-clamp 21 towards C-clamp 22 so as to grip control column 11. A gasket, such as rubber gasket (not shown), may be provided between the C-clamps 21, 22 and control column 11, if desired.

As shown, C-clamps 21 and 22 each have half-hexagonal shaped inner surfaces which terminate to flange extensions. In particular, inner surfaces 22A 22B and 22C of C-clamp 22 define a half hexagonal shaped inner surface; and inner surfaces 21A, 21B and 21C of C-clamp 22 define a half hexagonal shaped inner surface. Surface 21A terminates into flange extension 21D; surface 22A terminates into flange extension 21E. C-clamps 21 and 22 are designed to grip a circular control column, or any pole or dowel e.g., a column, pole or threaded dowel of $\frac{3}{4}$" to $1\frac{7}{8}$" diameter. C-clamps 21 and 22 preferably contact a circular column at four (4) contact points, with a minimum of three (3) contact points.

Rods 23A and 23B should at least have sufficient threads so that nuts 25A and 25B can be tightened sufficiently so as to provide sufficient pull force of C-clamp 21 towards C-clamp 22 (and vice versa). Rods 23A and 23B each can be $1\frac{1}{4}$"-20 threaded rods, $1\frac{5}{8}$" in length, or $1\frac{1}{4}$"-20 threaded rods, $2\frac{1}{4}$" in length. The length of rods 23A and 23B, is, of course, dependent upon the diameter of the column to be gripped, and, adjustment thereof is within the ambit of the skilled artisan.

In the illustrated embodiment, rods 23A and 23B are secured to C-clamp 21 (at flanges 21D and 21E) by pins 24A and 24B. Pins 24A and 24B each can be 1 1/16"×$\frac{7}{8}$" rolled steel pins. Flanges 21D and 21E slots or cut-outs 21F and 21G, respectively, through which to rods 23B and 23A, respectively pass, and, to which, by means of pins 24B and 24A, rods are connected. Flanges 22D and 22E have bore 22G and slot or cut-out 22F, respectively, through which rods 23B and 23A, also respectively pass (at the ends thereof opposite those which pass through cut-outs 21F and 21G). The cut-out 21F provides flange 21D with legs 21D' and 21D''; cut-out 21G provides flange 21E with legs 21E' and 21E''; and likewise, cut-out 22F provides flange 22D with legs 22D' and 22D''. Each of legs 21D', 21D'', 21E' and 21E'', is provided with a bore, as is each of rods 23A and 23B; these bores are perpendicular to the axis of rods 23A and 23B.

Perpendicular to the axis of rods 23A and 23B runs pins 24A and 24B: By means of the aforementioned bores, pin 24A runs through leg 21E', rod 23A, and leg 21E'' (the bores therethrough are substantially concentric); and, pin 24B runs through leg 21D', rod 23B, and leg 21D'' (the bores therethrough are substantially concentric); and thereby, rods 23A and 23B are affixed to C-clamp 21 at flanges 21D and 21E, respectively. The aforementioned bores can be 17/32" diameter. The aforementioned cut outs can be 17/32"×$\frac{5}{8}$" long. As illustrated, rod 23B can have about 180°–240°, e.g., about 200°, movement about the axis of pin 24B; and C-clamp 21 can likewise move about 200° the axis of pin 24A (e.g., when nut 25A is in place with rod 23A through bore 22G, and provided there is sufficient distance between C-clamps 21 and 22 to permit such movement).

With the pins 24A, 24B, connecting the rods 23A, 23B at one end to C-clamp 21, the other ends thereof are then directed to C-clamp 22. In particular, from pin 24A, rod 23A runs through bore 22G; from pin 24B, rod 23B runs through cut-out slot 22F. Nut 25A is then tightened upon rod 23A; and, nut 25B is then tightened upon rod 23B. This tightening provides preferred parallelism of the two halves of the "two C-clamp", i.e., C-clamps 21, 22. The resulting assembly allows the C-clamps 21, 22 to apply fairly equal pressure around control column 11. Nut 25B can be a wing nut so that with cut out 22F, C-clamp 22, and in general device 10, may be easily installed and removed from control column 11, manually with little and usually no tools. Likewise, nut 25A can be a hex nut or a wing nut, or any suitable nut. Between nut 25A and bore 22G a washer, e.g. a lock washer or split washer, can be provided.

Figure 7:
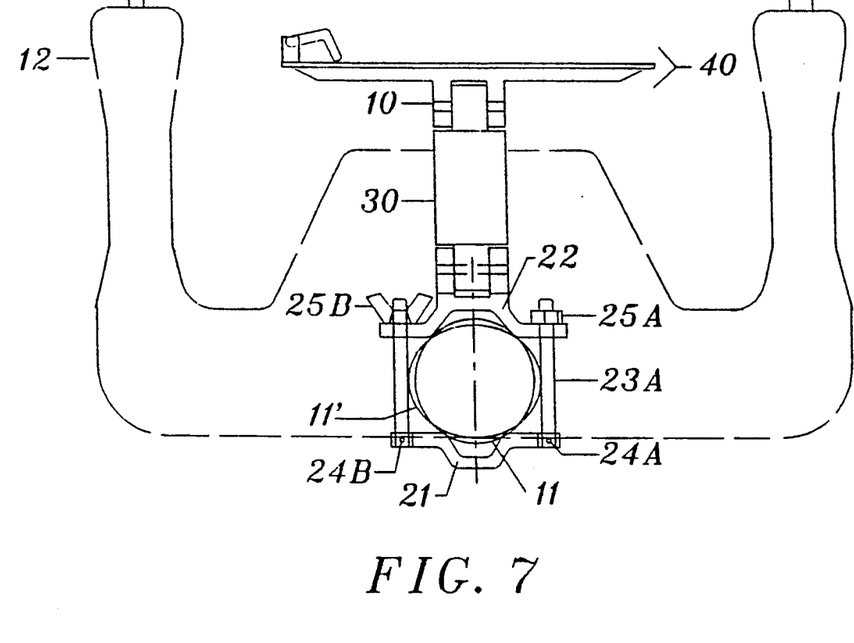
FIGS. 7 and 8 show embodiments of the present invention attached to an ovular column.

Although described in terms of rods 23A and 23B, pins 24A and 24B, and nuts 25A and 25B, any suitable means can be employed to cause a pull force to exist between C-clamps 21 and 22. And of course, if a non-circular, e.g, eliptical, column is to be attached to, clamps 21 and 22 can be modified to conform to gripping such a non-circular column, e.g., any suitable gripping means to grip a square, triangular, eliptical etc. shape, provided that arm 30 can be movably mounted to such gripping means so that arm 30 can move upwardly or downwardly with respect to the gripping means (See FIGS. 7 and 8 wherein embodiments of the invention are depicted attached to ovular column 11'). And indeed, gripping means 20 can be any suitable mean grip a column, again, preferably including means to movably connect arm 30 thereto. In this regard, reference is made to roof-mounted bicycle carriers by Industri AB Thule 330 33 Hillerstop, Sweden or THULE (trademark), e.g., the "THULE System 549 1 (1050-09-1)," which, as shown by an owner's manual therefor, incorporated herein by reference, employ a spring loaded device to grip the down-tube of the bicycle. Such a spring loaded gripping means can be used in the device herein, e.g., this type of spring clamp can be fitted with ears 22H, 22H' so as to join to arm 30 (as well as to clamp to a column).

Extending outwardly and perpendicularly from surface 22B of C-clamp 22 are extensions ("ears") 22H and 22H'; each ear 22H and 2H' has a bore 22I. Arm 30 has extension flange 30A and extension flange 30B. Extension flange 30A has bore 30C; and, extension flange 30B has bore 30D. Extension flange 30A matingly fits between ears 22H and 22H' such that bores 22I and 30C are substantially concentric. Pin 27A is inserted though bores 22I and 30C so as to effectuate the connection of arm 30 to C-clamp 22 (or more generally to gripping means 20), such that arm 30 is moveably connected to gripping means 20 (C-clamp 22), or, so as to jointedly or hingedly connect them. Arm 30 when so connected to gripping means 20 (C-clamp 22) can move upwardly or downwardly with respect to gripping means 20 (C-clamp 22) (especially when gripping means 20 (clamp 22) is in a fixed position such as when attached to control column 11).

Another perspective on this connection is that flange 30A can rotate about the axis of pin 27A; the limitations of this rotation being the points where arm 30 contact surface 22B' (the back face of surface 22B) of C-clamp 22 of gripping means 20. As shown, the downwardly movement or rotation limiting point of arm 30 is the point where body 30E of arm 30 contacts surface 22B', and, the upwardly movement or rotation limiting point of arm 30 is the point where flange 30A contacts surface 22B'. In other words, the rotation is approximately 180°-210° about the axis of pin 27A. or −90° to 180° about the axis of rotation. And, a further perspective on this connection is that ears 22H, 22H', flange 30A, the bores thereof 22I, 30C, and pin 27A form a hinge or a joint when pin 27A is inserted through said bores when said flange is matingly positioned between the ears, so as to connect gripping means 20 to arm 22. This is a flexible or movable joint, like one's elbow or knee.

Information display 40, as illustrated, comprises support 40A (including extensions ("ears") 40D and 40D'; each ear 40D, 40D' having a bore 40E), and board 40B (including rear face 40C', front face 40C, and paper holding means 40F). Support 40A and 40B can be one unitary piece. The center line between ears 40D and 40D' is preferably the center line of support 40A such that support 40A to the left and to the right of said center line is symmetrical.

Extension flange 30B of arm 30 matingly fits between ears 40D and 40D' such that bores 40E and 30D are substantially concentric. Pin 27B is inserted through bores 40E and 30D so as to effect the connection of arm 30 to information display 40 such that information display 40 is moveably connected to arm 30. Information display 40 when so connected to arm 30 can move upwardly or downwardly with respect to arm 30.

Another perspective on this mounting is that ears 40D and 40D' of support 40A of information display 40 can rotate about the axis of pin 27B; the limitations of this rotation being the points where arm 30 contact surface 40D'' or where arm 30 contacts rear face 40C' (when device 10 is assembled). As shown, the downwardly movement or rotation limiting point of information display 40 is, when device 10 is assembled (namely when board 40B is attached to support 40A), the point where flange 30A contacts rear face 40C', when unassembled, the point where body 30E contacts surface 40D''; and, the upwardly movement or rotation limiting point of information display 40 is the point when flange 30B contacts surface 40D''. In other words, when assembled the rotation about pin 27B is approximately 170°-190°, e.g., approaching approximately 180°, and when unassembled, approximately 170°-210°.

Likewise, a further perspective on this connection is that ears 40D, 40D', flange 30B, the bores there of 40E, 30D, and pin 27B form a joint or a hinge when pin 27B is inserted through said bores when said flange is matingly positioned between the ears. This is a flexible or movable joint.

Further, the arm-gripping means and arm-display joints can be formed by any suitable means. For instance, the flanges of arm 30, rather than being male members with respect to the ears of the gripping means and display, can also be extensions or ears (a bifurcated member) (with bores), such that the ears of the gripping means and/or display are male members with respect thereto; the contacting surfaces of these ears can be serated; and, between the ears of the gripping means and/or between the ears of the display, a sufficiently large bearing surface, e.g., a ball bearing, can be inserted. The serated contacting surfaces restrict movement in the joint, but not unduly; and the bearing surface allows for movement. Other suitable means to form such joints, e.g., ratchet means, can be employed.

Pins 27A and 27B each can be ⅛" diameter rolled steel pins and/or 8-32×1" or M4 ×25 mm bolts. The frictional tolerances of pins 27A and 27B through their respective bores, and of the mating of flanges 30A and 30B with their respective ears preferably permit the aforedescribed positional adjustment with average manual effort so that manipulation of device 10 is easily accomplished; and, sufficient friction so that when set in place device 10 can sufficiently stay in place, even when carrying papers on the information display, or, when the information display is a video display. Support 40A can be affixed to board 40B by rivets e.g., such that support 40A substantially or nearly abuts and preferably abuts rear face 40C. Paper holding means 40F can be a spring loaded clip riveted to board 40B, or, a ring binder, or the like. When a spring loaded clip riveted to the board 40B, paper holding means of is preferably made from chrome-plated steel. And, additional components, e.g., a light, flashlight, pen, writing instrument, wand (e.g., when information display 40 is a video display) etc. maybe attached to device 10, e.g., at information display 40.

Figure 3:
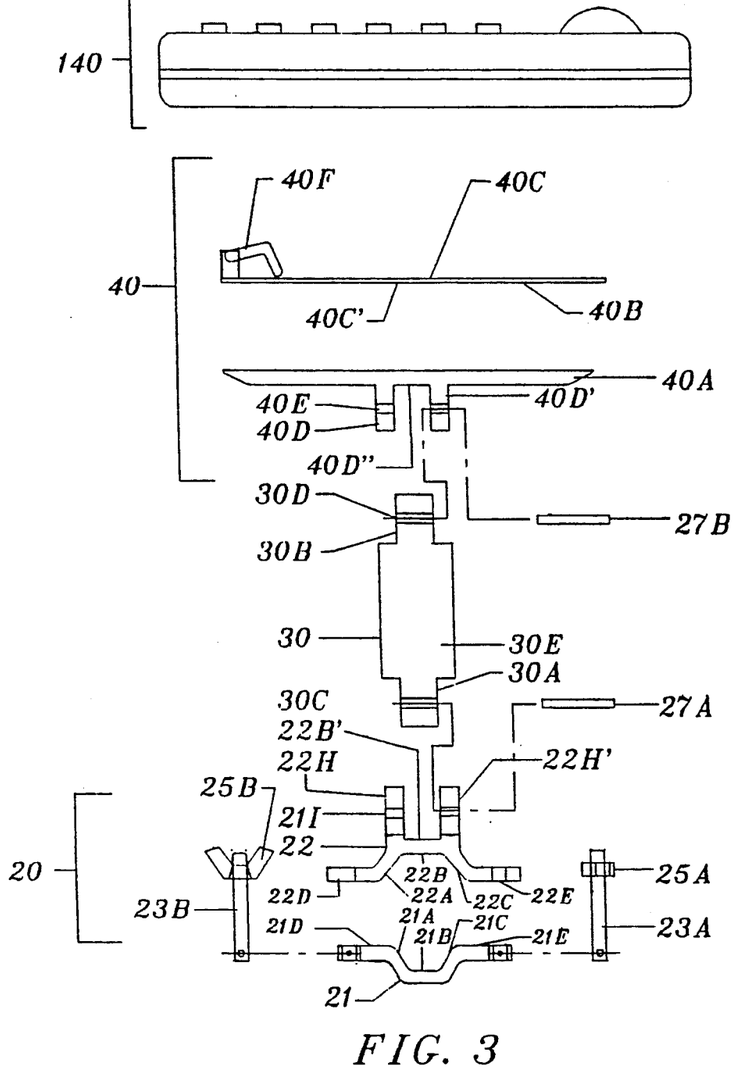
FIG. 3 shows an exploded view of the embodiment of FIGS. 1 and 2 in exploded plan view.
Figure 3A:
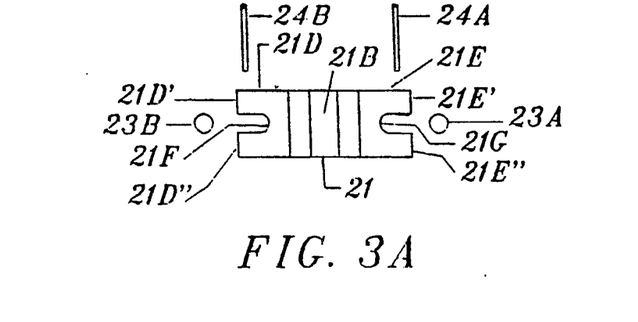
FIG. 3a shows a part of the embodiment of FIG. 3 in exploded plan view.
Figure 4A:
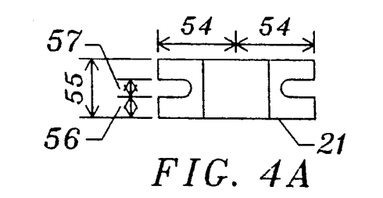
Figure 4B:
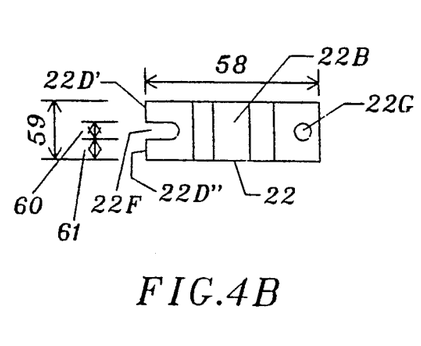
Figure 4C:
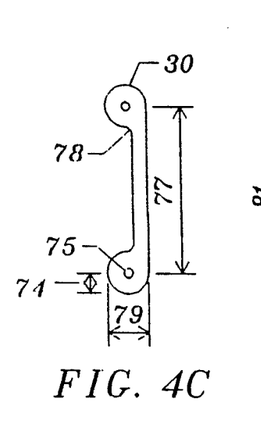
Figure 4D:
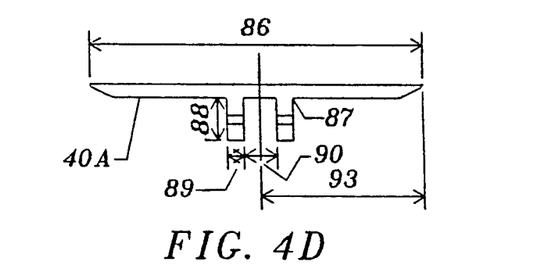
Figure 4E:
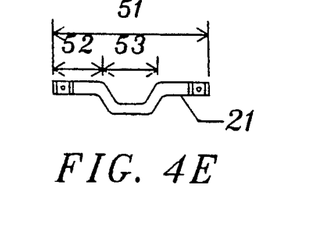
Figure 4F:
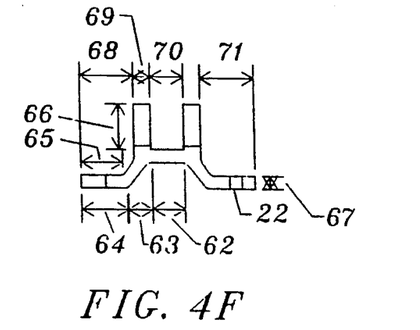
Figure 4G:
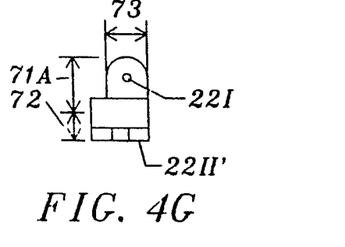
Figure 4H:
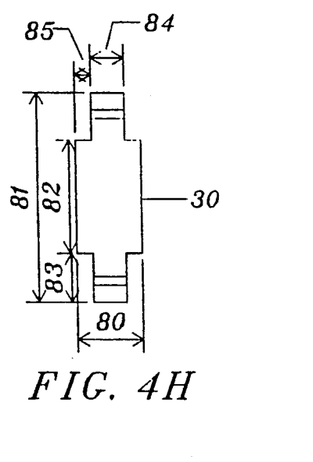
Figure 4I:
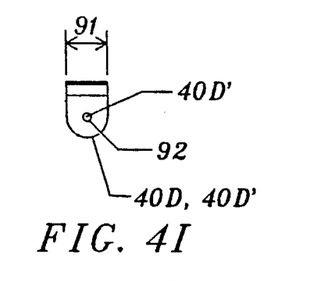

In FIGS. 4A-I, the various components of the embodiment of FIGS. 1-3 are shown. In FIGS. 4A and 4E, C-clamp 21 is shown in a top and side views. In FIGS. 4B, 4F and 4G, C-clamp 22 is shown in top and side views. In FIGS. 4C and 4H arm 30 is shown in top and side views. And, in FIGS. 40D and 40I support 40A is shown in top and side views. Reference numerals 51-93 in FIGS. 4A-D are for approximate dimensions, in inches ±0.005", for components of a presently preferred embodiment for attachment to the yoke column of an aircraft; and, the values thereof are set out in TABLE I, below.

TABLE I

| REFERENCE # | VALUE | COMMENTS (if any) |
|---|---|---|
| 51 | 2.360 | |
| 52 | 0.755 | |
| 53 | 0.845 | |
| 54 | 1.180 | (both halves symmetrical) |
| 55 | 0.874 | |
| 56 | 0.323 | |
| 57 | 0.256 | |
| 58 | 2.625 | (left and right of center symmertrical) |
| 59 | 0.874 | |
| 60 | 0.256 | |
| 61 | 0.323 | |
| 62 | 0.540 | |
| 63 | 0.358 | |
| 64 | 0.670 | |
| 65 | 0.599 | |
| 66 | 0.690 | |
| 67 | 0.194 | |
| 68 | 0.812 | |
| 69 | 0.249 | |
| 70 | 0.500 | |
| 71 | 0.812 | |
| 71A | 0.874 | |
| 72 | 0.388 | |
| 73 | 0.625 | |
| 74 | 0.3125 | (radius, 0.625 diameter) |
| 75 | ⅛" | |
| 76 | 0.224 | |
| 77 | 2.503 | |
| 78 | 0.125 | (diameter of fillet) |
| 79 | 0.626 | |
| 80 | 0.999 | |
| 81 | 3.137 | |
| 82 | 1.844 | |
| 83 | 0.649 | |
| 84 | 0.500 | |
| 85 | 0.250 | |
| 86 | 5.066 | |
| 87 | 0.031 | (corner fillets radius) |
| 88 | 0.631 | |
| 89 | 0.249 | |

TABLE I-continued

| REFERENCE # | VALUE | COMMENTS (if any) |
| --- | --- | --- |
| 90 | 0.501 | |
| 91 | 0.627 | |
| 92 | ⅛ | (diameter of bore) |
| 93 | 2.533 | (left and right symmertrical) |

In the presently preferred embodiment of FIGS. 4A–I, the pieces are preferably machined from 6063-T6 aluminum extrusion; and, board 40B is approximately 5½" wide ×7.0" long with thickness of preferably 1/16". The board 40 is preferably coated with a clear-coat, or, is annodized, e.g., black annodized or electroplated e.g., colored electroplate, vinyl covered, or the like to prevent oxidation. In these dimensions, the presently preferred embodiment of device 10 is designed to hold NOS (National Ocean Survey), Standard Terminal Approach (STAR), Standard Instrument Departure (SID) charts, as well as Jeppesen-Sandersen instrument approach and departure plates, and other important flight information such as clearances, checklists and sectional charts. When made and used as described herein and as shown in FIGS. 1–4I with respect to aircraft, the device of the present invention is attached to the yoke column, and rises up between the handles of the yoke, and can then be positioned to face the operator, e.g, with face 40C at an angle of approximately 0°–90° with a plane defined by the body of the operator, e.g., perpendicular to or parallel with the yoke handles, as desired by the operator, so as to allow for easy viewing of both the information and the flight instruments.

Of course, the components of the device of the present invention can be fabricated in any suitable fashion (e.g, casting, extrusion, molding such as blow molding or injection blow molding) and from any suitable materials. The materials should be capable sufficiently of withstanding the conditions of use, e.g., the heat/sunlight of cockpit, car interior, boat, etc., salt air of a boat and the like; and, it is also preferred to make the device of the present invention out of the lightest weight materials possible, without sacrificing sturdiness. Thus, in addition to aluminum, etc. as heretofore described, plastics such as molded hard plastics, e.g, aramids, acrylates, melamine formaldehydes, urea formaldehydes, urea resins, and the like, plastic composites, e.g., plastic-graphite such as Kevlar (trademark) -graphite composites, or plastic multilayer structures (e.g., laminates, extrusions, etc.) can be used as materials for the components of present invention.

However, aluminum, as heretofore described, is presently a preferred material because it offers light weight, ability to withstand sunlight/heat, and ease of and economic fabrication. But, this invention is not necessarily limited by the choice of material for the components. It is within the ambit of the skilled artisan to select other suitable materials, especially when given the conditions under which the device of the present invention is to be put to use and the degree one desires the device to so withstand those aforementioned harsh conditions. It is also preferred that when fabricated such as illustrated and described herein, that the closest possible tolerances, e.g., aluminum extrusion or casting, be maintained, although maintenance of closest possible tolerances is not to be considered as a limitation of the broad concept of the present invention.

Figure 5:
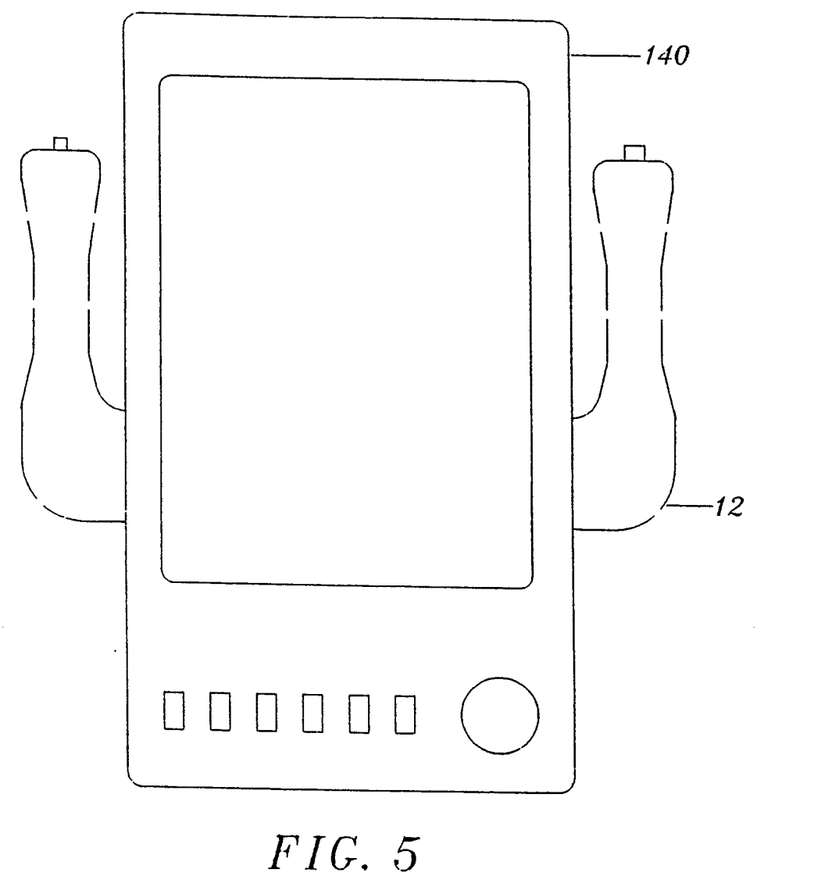
FIG. 5 shows an embodiment of the present invention including a computer/video display on a typical aircraft control column.
Figure 8:
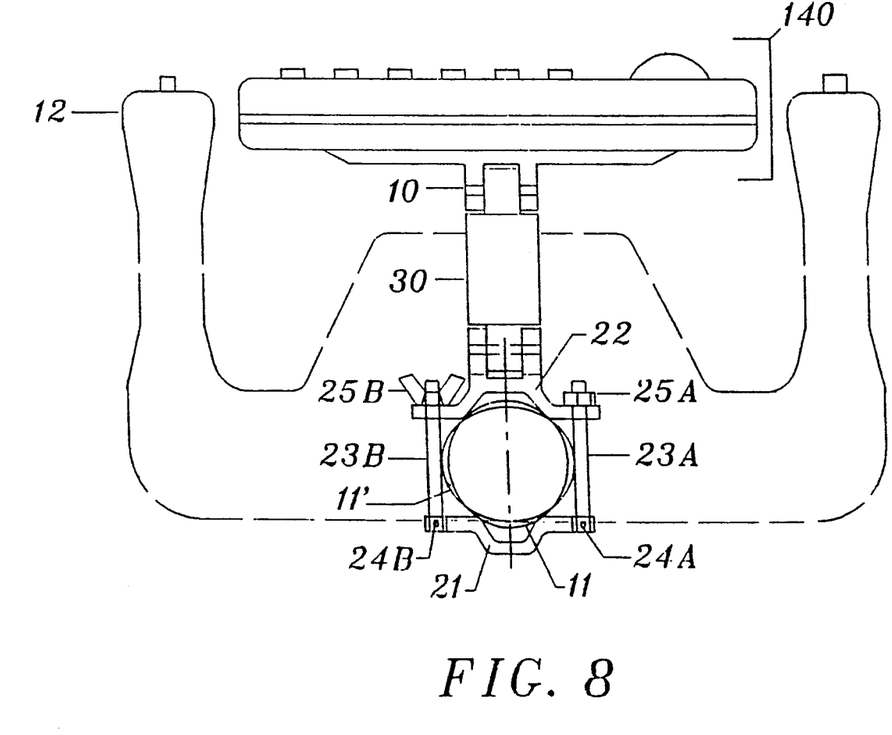

Tuning now to FIG. 5 and 8 which depicts a video display as information display 140 attached to a yoke column and between the yoke handles. The video display or computer can be any suitable computer such as a Moving Map Computer, e.g., the NV1000 and NV50 Moving Map Computers which were but may no longer be available from ARNAV, or any suitable LCD or plasma display which is compatible with and coupled to (e.g., by a jack such as a RS-232) a laptop computer (such as an IBM or IBM compatible laptop or Macintosh RS232 capable machine); in the latter instance any suitable available laptop software, which, when coupled through an RS-232 jack into the aircraft's LORAN is useful for providing real time navigational tracking. Such software is commercially available, e.g., products from ETAK, Menlo Park, Calif. In addition, video display 140 can be an instrument which communicates with the GPS (Global Positioning System) satellites being launched by the U.S. Government which can give at least corrdinates of where one is at during ground, air, or marine transportation, and, when coupled with computer stored maps, can also provide a moving map display. And, video display 140 can coordinate with marine navigational systems. The back face of the video display 140 is preferably attached to support 40A, e.g., by screws, rivets or the like, or, is preferably otherwise provided with ears 40D and 40D', e.g., the back face being molded plastic and ears 40D, 40D' molded thereinto, and, the remainder of the device of the present invention is as shown and described with reference to FIGS. 1–4I. It is prefered that the video display not exceed 5½" wide ×7.0" long.

Although aircraft applications have been the primary focus of the above description of the present invention, the device herein can be used in any suitable vehicle. It can be attached to columns other than a yoke column. And alternatively, the gripping means can be a mounting means, provided that the upwardly and downwardly movement of the arm and information display, and, the overall effect thereof (inward and outward movement of the information display), and the objectives of providing easy manipulation and essentially unobstructed view of instruments, are maintained. For instance, with reference to FIGS. 1–4I, C-clamp 21 can be removed and C-clamp 22 can be affixed directly (e.g., by self-tapping screws or the like) to an instrument panel (e.g., boat) or automobile dashboard. Certainly in this application, C-clamp 22 can be modified to a straight piece having two holes (e.g., for self tapping screws) and ears 22H and 22H' protruding appropriately therefrom (i.e., surfaces 22A, B, C, D, and E can be substantially flat, and cut-out 22F can be a bore).

Figure 6:
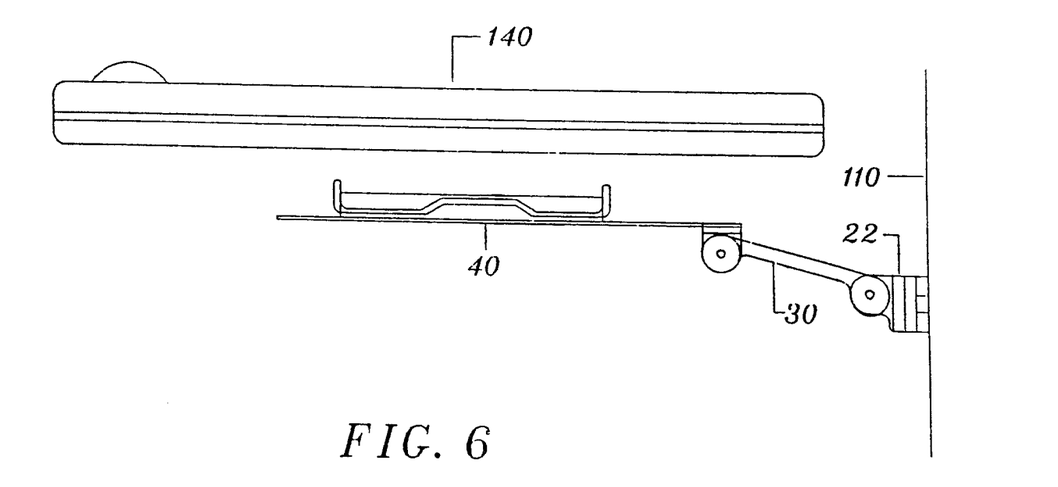
FIG. 6 shows an embodiment of the present invention attached to a fixed surface such as a vehicle instrument panel.

In particular, FIG. 6 shows an apparatus of the invention attached to fixed surface 110, which can be a vehicle instrument panel, with a video display 140 also shown since as shown in FIGS. 5 and 8, video display 140 can be used instead of information display 40.

Having thus described in detail preferred embodiments of the present invention, it should be understood that the present invention and the following claims are not to be construed as limited to the preferred embodiments as many obvious variations of which are possible and within the scope of the present invention.

What is claimed is:

1. An apparatus for attachment to a substantially circular or ovular column for displaying information, comprising:
   means to attach to the column;

an arm movably connected to the attaching means such that the arm can move upwardly or downwardly with respect to the attaching means;

means to movably connect the arm to the attaching means;

an information display movably connected to the arm such that the display can move upwardly and downwardly with respect to the arm, said information display having a front side and a back side; and, means to movably connect the display to the arm;

said attaching means comprising means to grip the column, said gripping means and connecting means of the arm to the attaching means comprising one of a male member and a bifurcated member protruding from the gripping means toward the arm, one of a male member and a bifurcated member protruding from the arm, such that when the gripping means and the arm are joined they are matingly positioned with respect to each other; and means to connect one of the male member and bifurcated member to one of the male member and bifurcated member;

wherein the effect of the connecting means of the arm to the attaching means and of the connecting means of the display to the arm is that the display can move inwardly and outwardly with respect to the column.

2. The apparatus of claim 1 wherein the gripping means and connecting means of the arm to the attaching means comprises a bifurcated member protruding from the gripping means comprising a pair of extensions protruding from the gripping means toward the arm, a male member protruding from the arm comprising a flange extension, said flange extension matingly positioned between the extensions of the pair of extensions protruding from the gripping means, and the means to connect the bifurcated member of the gripping means with the male member of the arm comprises means defining a bore through each of the flange extension and each extension of the pair of extensions such that when the flange extension is matingly positioned between the extensions of the pair of extensions, said bore is substantially concentric; and, a pin running through the bore.

3. The apparatus of claim 2 wherein the column comprises an aircraft yoke column.

4. The apparatus of claim 3 wherein the information display comprises a board having means to hold paper or a video display, and the gripping means includes a two C-clamp and the pair of extensions protrudes from the C-clamp closes the arm.

5. The apparatus of claim 2 wherein the column comprises a boat steering wheel column.

6. The apparatus of claim 2 wherein the column comprises an automobile steering wheel column.

7. The apparatus of claim 2 wherein the means to movably connect the information display to the arm comprises:

a pair of extensions protruding from the back side of the information display, a flange extension protruding from the arm and matingly positioned between the extension of the pair of extensions protruding from the back side of the information display, means defining a bore through each of the flange extension and each extension of the pair of extensions, such that when the flange extension is matingly positioned between the extensions of the pair of extensions, said bore is substantially concentric, and, a pin running through the bore.

8. The apparatus of claim 7 wherein the information display comprises a video display.

9. The apparatus of claim 7 wherein the information display comprises a clipboard with the clip on the front side.

10. The apparatus of claim 7 wherein the information display further comprises a display board, said display board having a front side and a rear side; and a support member from which the extensions protrude and to which the arm is movably connected; said support member being attached to the display board and, substantially abutting the back side of the display board.

11. The apparatus of claim 10 wherein the information display comprises a video display.

12. The apparatus of claim 10 wherein the information display comprises a board with means to hold paper comprising a clipboard, with the clip on the front side.

13. The apparatus of claim 12 wherein the information display comprises the clipboard, the pin running through the bore of the flange extension and pair of extensions protruding from the C-clamp comprises a rolled steel pin, screw or a bolt, the pin running through the bore of the flange extension and pair of extensions protruding from the information display comprises a rolled steel pin, screw or a bolt, the support is attached to the display by rivets, and, a pulling force towards each other between the two C-clamps is generated by said clamps being connected by a pair of sufficiently threaded rods positioned on either side of the column, each of said rods being attached at one end to a clamp by a pin connection, and, at the other end by a nut threaded on each of said rods.

14. The apparatus of claim 13, wherein at least one nut is a wing nut so that the apparatus can be easily removably attached to the column.

15. An apparatus for attachment to a column for displaying information comprising:

means to attach to the column, said means including a first pair of extensions, each extension having means defining a bore, an arm, said arm having a first flange extension at one end and a second flange extension at the other end, said first flange extension having means defining a bore, said second flange extension having means defining a bore, and, said first flange extension being matingly positioned between the extensions of the first pair of extensions such that the bores therethrough are substantially concentric, a first pin running through the bores of the first pair of extensions and the first flange extension so that the arm is movably connected to the attaching means such that the arm can move upwardly or downwardly with respect to the attaching means, an information display having a front side and a back side, and a second pair of extensions protruding from the back side, each extension having means defining a bore, and, said second flange extension being matingly positioned between the extensions of the second pair of extensions such that the bores therethrough are substantially concentric, and, a second pin running through the bores of the second pair of extensions and the second flange extension so that the information display is movably connected to the arm such that the display can move upwardly and downwardly with respect to the arm, and, the overall effect of the first pin and second pin connections is that the display can move inwardly and outwardly with respect to the column.

16. The apparatus of claim 15 wherein it is for attachment to a column comprising an aircraft yoke column, and the attaching means comprises a clamp.

17. The apparatus of claim 16 wherein: the clamp comprises two C-clamps, a pulling force between each C-clamp of the two C-clamps is generated by said clamps being connected by a pair of sufficiently threaded rods positioned on either side of the column, each of said rods being attached at one end to a clamp by a pin connection, and, at the other end by a nut threaded on each of said rods; the information display comprises a display board comprising either a video display or a board with means to hold paper, said display board having a front side and a back side, and a support member from which the second extensions protrude and to which the arm is movably connected by the second pin, said support member being attached to the display board and abutting the back side of the display board.

18. The apparatus of claim 17 wherein the display board comprises a board with means to hold paper comprising a clipboard with the clip on the front side.

19. The apparatus of claim 17 wherein at least one nut is a wing nut so that the apparatus can be easily removably attached to the column.

20. An apparatus for attachment to a vehicle instrument panel for displaying information comprising:
means to attach to the instrument panel;
an arm movably connected to the attaching means such that the arm can move upwardly or downwardly with respect to the attaching means;
means to movably connect the arm to the attaching means;
an information display movably connected to the arm such that the display can move upwardly and downwardly with respect to the arm, said information display having a front side and a back side; and,
means to movably connect the display to the arm;
said attaching means comprising means to mount to the panel, said mounting means comprising
a pair of extensions protruding from the mounting means toward the arm,
a flange extension protruding from the arm and matingly positioned between the extensions of the pair of extensions protruding from the mounting means,
means defining a bore through each of the flange and each extension of the pair of extensions, such that when the flange extension is matingly positioned between the extensions of the pair of extensions, said bore is substantially concentric, and,
a pin running through the bore,
wherein the effect of the connecting means of the arm to the attaching means and of the connecting means of the display to the arm is that the display can move inwardly and outwardly with respect to the instrument panel.

* * * * *